US009347854B2

(12) United States Patent
Nishiyuki et al.

(10) Patent No.: US 9,347,854 B2
(45) Date of Patent: May 24, 2016

(54) GLOW PLUG WITH PRESSURE SENSOR

(71) Applicant: NGK SPARK PLUG CO., LTD., Nagoya-shi, Aichi (JP)

(72) Inventors: Kenjiro Nishiyuki, Inazawa (JP); Yoshihiro Nakamura, Komaki (JP); Masayoshi Matsui, Ichinomiya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 13/927,866

(22) Filed: Jun. 26, 2013

(65) Prior Publication Data
US 2014/0000353 A1 Jan. 2, 2014

(30) Foreign Application Priority Data

Jun. 28, 2012 (JP) ................................. 2012-144863
Apr. 8, 2013 (JP) ................................... 2013-80170

(51) Int. Cl.
*G01M 15/08* (2006.01)
*F23Q 7/00* (2006.01)

(52) U.S. Cl.
CPC ............... *G01M 15/08* (2013.01); *F23Q 7/001* (2013.01); *F23Q 2007/002* (2013.01)

(58) Field of Classification Search
CPC .......................... G01M 15/08; F23Q 2007/002
USPC ................. 73/114.16, 114.18, 114.19, 114.21
See application file for complete search history.

(56) References Cited

U.S. PATENT DOCUMENTS

| | | | |
|---|---|---|---|
| 6,411,038 B2 * | 6/2002 | Murai et al. ..................... | 315/55 |
| 6,512,204 B1 | 1/2003 | Chiu et al. | |
| 6,539,787 B1 * | 4/2003 | Murai et al. ................ | 73/114.21 |
| 6,575,039 B2 * | 6/2003 | Murai et al. ..................... | 73/756 |
| 7,581,520 B2 * | 9/2009 | Kern et al. ................ | 123/145 A |
| 8,003,917 B2 | 8/2011 | Kern et al. | |
| 8,217,309 B2 * | 7/2012 | Burrows et al. ............... | 219/267 |

(Continued)

FOREIGN PATENT DOCUMENTS

| DE | 102006057627 A1 | 6/2008 |
|---|---|---|
| EP | 2559943 A1 | 2/2013 |

(Continued)

OTHER PUBLICATIONS

Communication dated Jun. 26, 2014, issued by the European Patent Office in corresponding Application No. 13173262.0.

(Continued)

*Primary Examiner* — Eric S McCall
(74) *Attorney, Agent, or Firm* — Sughrue Mion, PLLC

(57) ABSTRACT

A glow plug with a pressure sensor including a heater member (4) having a heating element (9) disposed therein and projecting from a forward end of a metallic shell (2), a center rod (3) having, at its forward end, a connection portion (3A) to which a rear end portion of the heating element (9) is connected, and an annular clearance CR formed between the metallic shell and the heater member in a region located on the forward end side of a junction portion (14A) of a deformable member (14) joined to the heater member. A portion of the heating element located on the forward end side relative to the forward end of the connection portion is at least partially located on the radially inner side of the clearance CR, and the forward end of the connection portion is located on the forward end side relative to the forward end of the junction portion.

3 Claims, 2 Drawing Sheets

(56) References Cited

U.S. PATENT DOCUMENTS

| | | | |
|---|---|---|---|
| 8,567,237 B2* | 10/2013 | Maeda et al. | 73/114.18 |
| 2001/0015402 A1* | 8/2001 | Murai et al. | 248/554 |
| 2006/0053875 A1* | 3/2006 | Haussner et al. | 73/116 |
| 2008/0302323 A1* | 12/2008 | Kern et al. | 123/145 A |
| 2010/0037698 A1 | 2/2010 | Kern et al. | |
| 2010/0122975 A1* | 5/2010 | Burrows et al. | 219/267 |
| 2011/0005308 A1 | 1/2011 | Kern et al. | |
| 2011/0271748 A1* | 11/2011 | Maeda et al. | 73/114.18 |
| 2013/0042831 A1 | 2/2013 | Nishiyuki et al. | |
| 2013/0291820 A1* | 11/2013 | Watanabe et al. | 123/145 A |
| 2013/0319094 A1* | 12/2013 | Nakamura et al. | 73/114.19 |
| 2013/0333456 A1* | 12/2013 | Maeda et al. | 73/114.18 |

FOREIGN PATENT DOCUMENTS

| | | |
|---|---|---|
| FR | 2824114 A1 | 10/2002 |
| JP | 2009-520941 A | 5/2009 |

OTHER PUBLICATIONS

Communication dated May 28, 2015, issued by the Korean Intellectual Property Office in counterpart Korean application No. 10-2013-0073666.

* cited by examiner

GLOW PLUG WITH PRESSURE SENSOR

BACKGROUND OF THE INVENTION

1. Field of the Invention

The present invention relates to a glow plug with a pressure sensor used for an internal combustion engine or the like.

2. Description of the Related Art

Conventionally, a glow plug used, e.g., for assisting startup of an internal combustion engine such as a diesel engine, includes a tubular metallic shell which has an axial hole extending in an axial direction; and a heater member inserted into the axial hole; a center rod which is inserted into the axial hole and through which electric current is supplied to the heater member; etc. (see, for example, Patent Document 1). In some cases, a heater including a heating element which is disposed within a metallic tube and generates heat upon supply of electric current from the center rod is employed as the heater member.

Further, in recent years, a glow plug with a pressure sensor has been proposed which imparts a function of detecting pressure (e.g., combustion pressure). In such a glow plug with a pressure sensor, a heater member whose forward end portion projects from the forward end of a metallic shell is attached to the metallic shell via a deformable member which is deformable along the axis such that the heater member can move relative to the metallic shell. When combustion pressure is applied to move the heater member and the deformable member relative to the metallic shell, this relative displacement (movement) is transferred to the pressure sensor, which outputs a signal corresponding to the amount of relative displacement of the heater member (i.e., the pressure applied to the heater member and the deformable member).

In order for the deformable member to smoothly respond to combustion pressure or the like, an annular clearance is formed between the outer circumferential surface of the heater member (tube) and the inner circumferential surface of the metallic shell. More particularly, the annular clearance is formed in a region located on the forward end side of a junction portion of the deformable member which is joined to the heater member.

[Patent Document 1] Japanese Unexamined Patent Application Publication No. 2009-520941

3. Problems to be Solved by the Invention

Soot produced as a result of operation of an internal combustion engine or the like may enter and clog the above-described clearance. In such a case, since the deformable member is hindered from receiving the full impact of the combustion pressure or the like, the resulting pressure detection sensitivity may be lowered.

SUMMARY OF THE INVENTION

The present invention has been made to solve the above problem, and an object thereof is to provide a glow plug with a pressure sensor which can effectively suppress clogging of the above-mentioned clearance by soot, to thereby more reliably prevent a reduction in pressure detection sensitivity.

The above object has been achieved by providing, in a first configuration (1), a glow plug with a pressure sensor which comprises:

a tubular metallic shell which has an axial hole extending in a direction of an axis;

a heater member which is inserted into the axial hole such that at least a forward end portion of the heater member projects from a forward end of the metallic shell;

a center rod which extends in the direction of the axis, which is inserted into the axial hole, and which forms an electrical path for supplying electric current to the heater member;

a deformable member including a junction portion having an inner circumference which is joined to the heater member, the deformable member holding the heater member in a state in which the heater member can move along the direction of the axis relative to the metallic shell, and which deformable member can deform along the axis; and a pressure sensor which is fixed to the metallic shell directly or indirectly and which detects pressure on the basis of relative displacement of the heater member, the heater member including a tube extending in the direction of the axis, and a heating element which is disposed inside the tube, the heating element having a forward end located on the forward end side relative to a forward end of the metallic shell, and which generates heat upon supply of electric current from the center rod, and the center rod having a connection portion which is formed at a forward end of the center rod and to which a rear end portion of the heating element is connected, the glow plug being characterized in that an annular clearance is formed between the metallic shell and the heater member in a region located on the forward end side of the junction portion;

a portion of the heating element located on the forward end side relative to a forward end of the connection portion is at least partially located on a radially inner side of the clearance; and the forward end of the connection portion is located on the forward end side relative to a forward end of the junction portion.

According to the above-described configuration (1), a portion of the heating element located on the forward end side relative to the forward end of the connection portion (namely, a portion of the heating element which is not in contact with the center rod and whose temperature becomes very high) is at least partially located on the radially inner side of the clearance formed between the heater member and the metallic shell. Accordingly, when the heater member generates heat, soot having entered the clearance can be burned and removed effectively, whereby clogging of the clearance by soot can be suppressed quite effectively. As a result, lowering of pressure detection sensitivity can be prevented more reliably.

Meanwhile, if the portion of the heating element located on the forward end side relative to the forward end of the connection portion is disposed on the radially inner side of the junction portion which is joined to the heater member, when the heater member generates heat, the junction portion (deformable member) is heated excessively, and the durability of the deformable member may deteriorate.

In contrast, according to the above-described configuration (1), the forward end of the connection portion is located on the forward end side relative to the forward end of the junction portion, whereby the portion of the heating element located on the forward end side relative to the forward end of the connection portion is separated from the junction portion. Accordingly, less heat generated by the heating element is transmitted to the junction portion (deformable member), and overheating of the deformable member can be prevented more reliably. As a result, the deformable member can have satisfactory durability.

In a preferred configuration (2) of the glow plug (1) above, a narrowest portion where the clearance has the smallest size in a direction orthogonal to the axis is provided at a forward end of a region over which the clearance extends; and the portion of the heating element located on the forward end side relative to the forward end of the connection portion extends over at least a portion of the region over which the narrowest portion extends along the axis.

According to the above-described configuration (2), the narrowest portion where the size of the clearance as measured in the direction orthogonal to the axis is smallest is provided at the forward end of the region over which the clearance extends. Accordingly, the amount of combustion gas which enters the clearance can be reduced, and instantaneous thermal expansion of the deformable member can be prevented more reliably. As a result, the pressure detection sensitivity can be enhanced.

Meanwhile, the narrowest portion may be clogged by a relatively small amount of soot. However, according to the above-described configuration (2), the portion of the heating element located on the forward end side relative to the forward end of the connection portion extends over at least a portion of the region over which the narrowest portion extends along the axis. Namely, the portion of the heating element whose temperature becomes very high is disposed on the radially inner side of the narrowest portion over at least a portion of the region over which the narrowest portion extends. Accordingly, when the heater member generates heat, soot having entered the narrowest portion can be burned and removed effectively, whereby clogging of the clearance by soot can be suppressed more reliably. As a result, lowering of pressure detection sensitivity can be prevented further more reliably.

In a preferred configuration (3) of the glow plug (2) above, the portion of the heating element located on the forward end side relative to the forward end of the connection portion extends over the entirety of the region over which the narrowest portion extends along the axis.

According to the above-described configuration (3), the portion of the heating element located on the forward end side relative to the forward end of the connection portion extends over the entirety of the region over which the narrowest portion extends along the axis. Namely, the portion of the heating element whose temperature becomes very high is disposed on the radially inner side of the narrowest portion over the entirety of the region over which the narrowest portion extends. Accordingly, when the heater member generates heat, soot having entered the narrowest portion can be burned and removed quite effectively, whereby clogging of the clearance by soot can be suppressed more reliably. As a result, lowering of the pressure detection sensitivity can be prevented considerably effectively.

DESCRIPTION OF REFERENCE NUMERALS AND SYMBOLS

Figure 1:
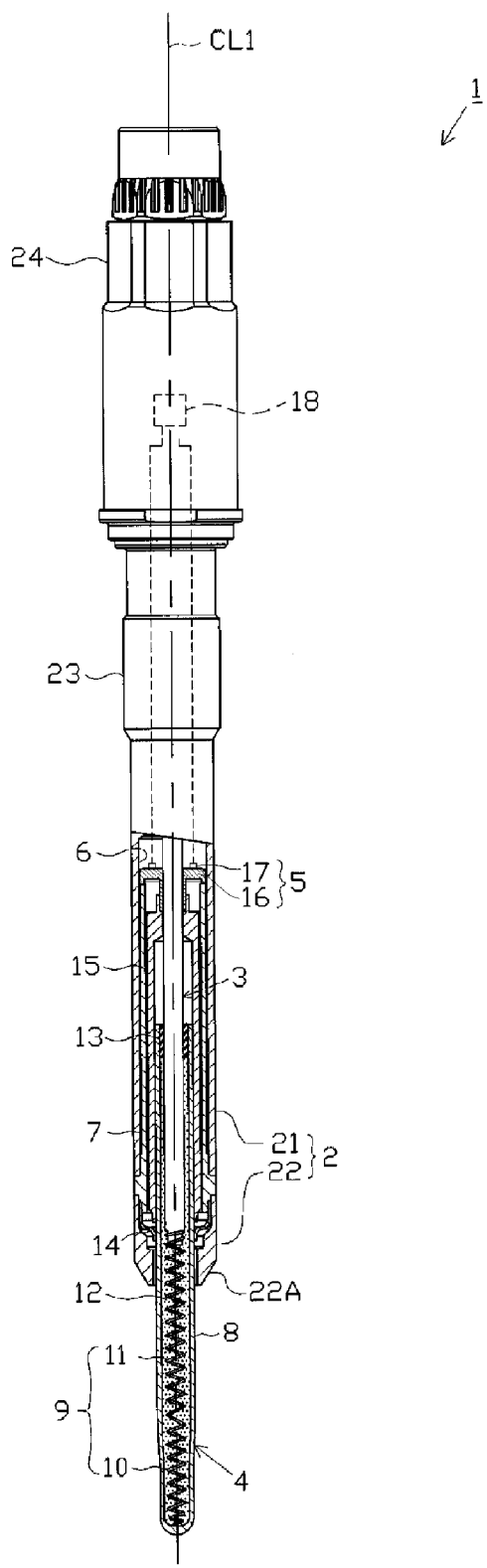
FIG. 1 is a partially sectioned front view showing the structure of a glow plug.

Reference numerals used to identify various features in the drawings include the following.
1: glow plug (glow plug with a pressure sensor)
2: metallic shell
3: center rod
3A: connection portion
3F: forward end (of the connection portion)
4: heater member
5: pressure sensor
6: axial hole
8: tube
9: heating element
14: deformable member
14A: junction portion
14F: forward end (of the junction portion)
CL1: axis
CR: clearance
NC: narrowest portion

DETAILED DESCRIPTION OF THE PREFERRED EMBODIMENTS

An embodiment of the invention will now be described with reference to the drawings. However, the present invention should not be construed as being limited thereto.

FIG. 1 is a partially sectioned front view of a glow plug 1 with a pressure sensor (hereinafter referred to as the "glow plug 1"). Notably, in FIG. 1, etc., the lower side corresponds to the forward end side of the glow plug 1, and the upper side corresponds to the rear end side of the glow plug 1.

As shown in FIG. 1, the glow plug 1 includes a metallic shell 2, a center rod 3, a heater member 4, a pressure sensor 5, etc.

The metallic shell 2 has an axial hole 6 extending in the direction of an axis CL1, and includes a tubular housing 21 and a tubular cap member 22, each of which is formed of a predetermined metallic material (for example, an iron material such as S45C).

The housing 21 has a male screw portion 23 which is formed on the outer circumference thereof and is used for attaching the glow plug 1 to the cylinder head of an engine or the like. The housing 21 also has a tool engaging portion 24 formed on the outer circumference of a rear end portion thereof. The tool engaging portion 24 has a hexagonal cross section. When the glow plug 1 (the male screw portion 23) is attached to the above-mentioned cylinder head or the like, a tool to be used is engaged with the tool engaging portion 24.

Furthermore, a tubular sensor fixing member 7 made of metal extending along the direction of the axis CL1 is inserted into a forward end portion of the housing 21. A forward end portion of the sensor fixing member 7 is joined to the forward end portion of the housing 21, and a rear end portion of the sensor fixing member 7 is joined to a diaphragm 16 of the pressure sensor 5 described below. Thus, the pressure sensor 5 is fixed indirectly to the metallic shell 2 (the housing 21) via the sensor fixing member 7.

The cap member 22 is fixed to the forward end portion of the housing 21 via the sensor fixing member 7, and has a taper portion 22A which is formed on the outer circumference of a forward end portion of the cap member 22 and whose diameter decreases toward the forward end side with respect to the direction of the axis CL1. When the glow plug 1 is attached to the engine, the taper portion 22A comes into pressure-contact with a seat surface of the engine to thereby secure the airtightness of a corresponding combustion chamber.

The center rod 3 is inserted into the above-mentioned axial hole 6, and has the shape of a bar extending along the axis CL1. The center rod 3 is a portion for forming an electrical path for supplying electric current to the heater member 4, and is formed of an electrically conductive metal (e.g., an iron alloy or the like).

The heater member 4 has the shape of a round bar. A rear end portion of the heater member 4 is inserted into the axial hole 6, and a forward end portion of the heater member 4 projects from the forward end of the metallic shell 2. The heater member 4 includes a tube 8, and a heating element 9 which is disposed inside the tube 8 and which generates heat when electric current is supplied from the center rod 3. A forward end portion of the heating element 9 is located on the forward end side relative to the forward end of the metallic shell 2. The heating element 9 includes a heat generation coil 10 and a control coil 11 connected in series.

The tube 8 is formed of a metallic material (e.g., nickel alloy, stainless steel alloy, or the like) which contains iron (Fe) or nickel (Ni) as a main component, and is a tube which is closed at the forward end thereof. The heat generation coil 10 whose forward end portion is joined to the forward end of the tube 8 and the control coil 11 connected in series to a rear end portion of the heat generation coil 10 are enclosed in the tube 8 together with an insulating powder 12 containing magnesium oxide powder. Notably, although the heat generation coil 10 is electrically connected at its forward end to the tube 8, the outer circumferential surfaces of the heat generation coil 10 and the control coil 11 are insulated from the inner circumferential surface of the tube 8 because of the presence of the insulating powder 12.

Further, an annular rubber member 13 formed of a predetermined rubber (e.g., silicone rubber or fluoro rubber) having excellent heat resistance is disposed between the center rod 3 and the inner circumference of a rear end portion of the tube 8, whereby the interior of the tube 8 is sealed.

The heat generation coil 10 is connected in series to the center rod 3 via the control coil 11, and is formed by spirally winding a resistance heating wire formed of a predetermined metallic material (e.g., an alloy which contains Fe as a main component and Al, Cr, etc., as additional components).

The control coil 11 is formed by spirally winding a resistance heating wire formed of a metallic material which has a greater temperature coefficient of electrical resistivity than the material of the heat generation coil 10 (e.g., a metallic material which contains Co or Ni as a main component, such as cobalt (Co)—Ni—Fe alloy). Thus, the electrical resistance of the control coil 11 increases upon receipt of heat from the heat generation coil 10 and the control coil 11 itself to thereby control the electric power supplied to the heat generation coil 10. Specifically, at the beginning of energization, a relatively large amount of electric power is supplied to the heat generation coil 10, whereby the temperature of the heat generation coil 10 rises quickly. As a result, the control coil 11 is heated by the heat generation of the heat generation coil 10 and the heat generation of the control coil 11 itself, and the electrical resistance of the control coil 11 increases, whereby the electric power supplied to the heat generation coil 10 decreases. As a result, the heater member 4 has a temperature rising characteristic in which after a quick temperature rise at the beginning of energization, the electric power supplied to the heat generation coil 10 is restrained by action of the control coil 11, whereby the temperature becomes saturated. Namely, the heating element 9 is configured such that, by providing the control coil 11, excessive temperature rise (overshoot) of the heat generation coil 10 is suppressed, while the performance of a quickly raising temperature is enhanced.

Figure 2:
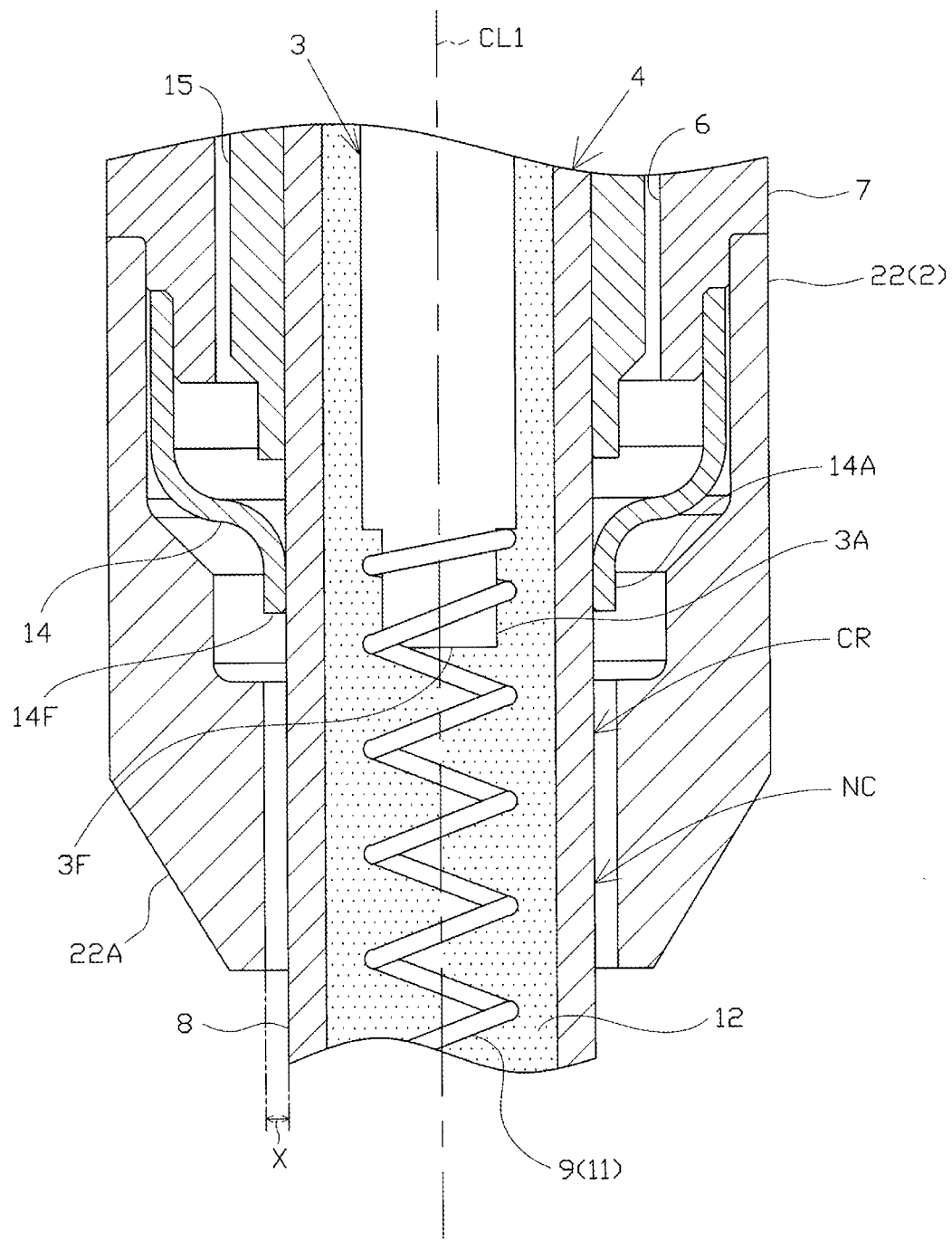
FIG. 2 is an enlarged sectional view of a portion of the glow plug.

The heater member 4 is mounted to the metallic shell 2 (housing 21) via a tubular deformable member 14. As shown in FIG. 2, the deformable member 14 has, at its one end, an annular junction portion 14A, the inner circumference of which is joined to the heater member 4. An opening portion of the deformable member 14 at its one end has a relatively small diameter, and another opening portion of the deformable member 14 at its other end has a relatively large diameter. The deformable member 14 has a plurality of (two in the present embodiment) bent portions between the two opening portions. In addition, the deformable member 14 is formed to have a thin wall thickness by using a predetermined metallic material (e.g., stainless steel, nickel alloy, etc.). The provision of the plurality of bent portions, combined with a reduced wall thickness, enables the deformable member 14 to expand and contract along the axis CL1. As a result, the heater member 4 held by the deformable member 14 can move along the direction of the axis CL1 relative to the metallic shell 2 when pressure such as combustion pressure acts on the forward end portion of the heater member 4 and on a forward end surface of the deformable member 14.

Notably, in the present embodiment, in order to allow smooth relative displacement of the heater member 4, an annular clearance CR is formed between the outer circumferential surface of the heater member 4 and the inner circumferential surface of the metallic shell 2 (cap member 22) in a region located on the forward end side of the junction portion 14A. In addition, a narrowest portion NC where the size of the clearance CR as measured in the direction orthogonal to the axis CL1 is smallest is provided at the forward end of the region over which the clearance CR extends. By providing such a narrowest portion NC, the amount of combustion gas which flows through the clearance CR toward the housing 21 side can be reduced to a sufficient degree, and instantaneous thermal expansion of the deformable member 14 can be prevented more reliably. Notably, in the present embodiment, the size X of the narrowest portion NC as measured in the direction orthogonal to the axis CL1 is set to a predetermined value (e.g., 0.3 mm) or less.

In addition, one end of the deformable member 14 is welded to the heater member 4 (tube 8) over the entire circumference thereof, and the other end of the deformable member 14 is welded to the forward end portion of the heater fixing member 7 over the entire circumference thereof. This configuration makes it possible to more reliably prevent combustion gas having entered through the clearance CR from flowing into the housing 21 and then leaking to the outside.

Referring back to FIG. 1, a tubular transmission member 15 is joined to the outer circumference of a portion of the heater member 4 located on the rear end side of a portion of thereof to which the deformable member 14 is joined. A rear end portion of the transmission member 15 is connected to the pressure sensor 5 (diaphragm 16) so that relative displacement of the heater member 4 is transmitted to the pressure sensor 5 through the transmission member 15. Notably, in the present embodiment, since the pressure sensor 5 is provided within the axial hole 6 as described above, the length of the transmission member 15 along the axis CL1 can be made relatively small. As a result, the transmission member 15 has a high natural frequency and is less likely to vibrate. Therefore, the displacement of the heater member 4 is accurately transmitted to the pressure sensor 5. As a result, the pressure detection accuracy of the pressure sensor 5 is improved.

The pressure sensor 5 is provided on the forward end side of the central portion (with respect to the direction of the axis CL1) of the housing 21. The pressure sensor 5 includes the diaphragm 16 formed of a metallic material (e.g., stainless steel), and a sensor element 17 (a piezoresistor in the present embodiment) joined to a surface of the diaphragm 16 located on the rear end side thereof. The diaphragm 16 has, at its center, a through hole through which the center rod 3 extends. The rear end portion of the transmission member 15 is joined to the diaphragm 16. Therefore, when the heater member 4 moves upon receipt of combustion pressure or the like, the diaphragm 16 deflectively deforms by an amount corresponding to the amount of displacement of the heater member 4.

The resistance of the sensor element 17 changes as a result of deflective deformation of the diaphragm 16. The resistance of the sensor element 17 is converted to a voltage signal by an integrated circuit 18 (see FIG. 1) provided in the housing 21, and the resultant voltage signal is amplified by the integrated circuit 18. The amplified voltage signal (i.e., a signal representing the pressure acting on the heater member 4) is output to an external circuit (not shown) such as an ECU via an unillustrated cable or the like.

As shown in FIG. 2, the center rod 3 has, at its forward end, a connection portion 3A which has a relatively small diameter. A rear end portion of the heating element 9 (control coil 11) is joined (welded in the present embodiment) to the outer circumference of the connection portion 3A. A portion of the heating element 9 located on the forward end side relative to the forward end 3F of the connection portion 3A (namely, a portion of the heating element 9 which is not in contact with the center rod 3 and whose temperature becomes very high) is at least partially located on the radially inner side of the clearance CR. In particular, in the present embodiment, the portion of the heating element 9 located on the forward end side relative to the forward end 3F of the connection portion 3A is located on the radially inner side of the narrowest portion NC over the entire region over which the narrowest portion NC is formed along the axis CL1.

Moreover, in the present embodiment, the forward end 3F of the connection portion 3A is located on the forward end side relative to the forward end 14F of the junction portion 14A. Namely, the portion of the heating element 9 which is not in contact with the center rod 3 and whose temperature becomes very high is separated from the junction portion 14A in the direction of the axis CL1.

As having been described in detail, according to the present embodiment, the portion of the heating element 9 located on the forward end side relative to the forward end 3F of the connection portion 3A is at least partially located on the radially inner side of the clearance CR. Accordingly, when the heater member 4 generates heat, soot having entered the clearance CR can be burned and removed effectively, whereby clogging of the clearance CR by soot can be suppressed quite effectively. As a result, lowering of pressure detection sensitivity can be prevented more reliably.

In addition, the narrowest portion NC where the size of the clearance CR as measured in the direction orthogonal to the axis CL1 is smallest and the size X thereof is set to a predetermined value or less is provided at the forward end of the region over which the clearance CR extends. Accordingly, the amount of combustion gas which enters the clearance CR can be reduced, and instantaneous thermal expansion of the deformable member 14 can be prevented more reliably. As a result, pressure detection sensitivity can be enhanced.

Meanwhile, in the narrowest portion NC where the size X is small as described above, the clearance CR (the narrowest portion NC) may be clogged by a small amount of soot. In order to solve this problem, in the present embodiment, the portion of the heating element 9 located on the forward end side relative to the forward end 3F of the connection portion 3A is located on the radially inner side of the narrowest portion NC over the entire region over which the narrowest portion NC is formed along the axis CL1. Namely, the portion of the heating element 9 whose temperature becomes very high is disposed on the radially inner side of the narrowest portion NC over the entire region over which the narrowest portion NC extends. Accordingly, when the heater member 4 generates heat, soot having entered the narrowest portion NC can be burned and removed quite effectively, whereby clogging of the clearance CR by soot can be suppressed more reliably. As a result, lowering of pressure detection sensitivity can be prevented with greater reliability.

Moreover, in the present embodiment, the forward end 3F of the connection portion 3A is located on the forward end side relative to the forward end 14F of the junction portion 14A. Accordingly, less heat generated by the heating element 9 is transmitted to the junction portion 14A (deformable member 14), and overheating of the deformable member 14 can be prevented more reliably. As a result, the deformable member 14 can have satisfactory durability.

The present invention is not limited to the above-described embodiment, but may be embodied, for example, as follows. Of course, applications and modifications other than those exemplified below are also possible.

(a) In the above-described embodiment, the heating element 9 is composed of the heat generation coil 10 and the control coil 11. However, the embodiment may be modified such that the control coil is omitted, and the heating element is formed by the heat generation coil only.

(b) In the above-described embodiment, a piezoresistor is used as a sensor element. However, a piezoelectric element or the like may be used as a sensor element.

(c) In the above-described embodiment, the heater member 4 has the shape of a round bar; i.e., has a circular cross section. However, the heater member 4 need not have a circular cross section, and no limitation is imposed on the shape of the heater member 4.

(d) No limitation is imposed on the shape of the deformable member 14 so long as the deformable member 14 can deform along the direction of the axis CL1. Accordingly, a member having a bellows-shaped tubular portion which extends in the direction of the axis CL1 may be used as the deformable member. Also, an annular member which extends in a direction perpendicular to the axis CL1 and which can deflectively deform in the direction of the axis CL1 may be used as the deformable member.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

This application is based on Japanese Patent Application No. 2012-144863 filed Jun. 28, 2012 and Japanese Patent Application No. 2013-80170 filed Apr. 8, 2013, the above-noted applications incorporated herein by reference in their entirety.

What is claimed is:
1. A glow plug with a pressure sensor, comprising:
a tubular metallic shell which has an axial hole extending in a direction of an axis;
a heater member which is inserted into the axial hole such that at least a forward end portion of the heater member projects from a forward end of the metallic shell;
a center rod which extends in the direction of the axis, which is inserted into the axial hole, and which forms an electrical path for supplying electric current to the heater member;
a deformable member including a junction portion having an inner circumference which is joined to the heater member, the deformable member holding the heater member in a state in which the heater member can move along the direction of the axis relative to the metallic shell, and which deformable member can deform along the axis; and
a pressure sensor which is fixed to the metallic shell directly or indirectly and which detects pressure on the basis of relative displacement of the heater member,
the heater member including a tube extending in the direction of the axis, and a heating element which is disposed inside the tube, the heating element having a forward end located on the forward end side relative to a forward end of the metallic shell, and which generates heat upon supply of electric current from the center rod, and
the center rod having a connection portion which is formed at a forward end of the center rod and to which a rear end portion of the heating element is connected,
the glow plug being characterized in that
an annular clearance is formed between the metallic shell and the heater member in a region located on the forward end side of the junction portion;
a portion of the heating element located on the forward end side relative to a forward end of the connection portion is at least partially located on a radially inner side of the clearance; and
the forward end of the connection portion is located on the forward end side relative to a forward end of the junction portion, such that the forward end of the connection portion extends beyond the forward end of the junction portion in the forward direction of the glow plug.

2. The glow plug with a pressure sensor as claimed in claim 1, wherein
a narrowest portion where the clearance has the smallest size in a direction orthogonal to the axis is provided al a forward end of a region over which the clearance extends; and
the portion of the heating element located on the forward end side relative to the forward end of the connection portion extends over at least a portion of the region over which the narrowest portion extends along the axis.

3. The glow plug with a pressure sensor as claimed in claim 2, wherein the portion of the heating element located on the forward end side relative to the forward end of the connection portion extends over the entirety of the region over which the narrowest portion extends along the axis.

* * * * *